US010104673B2

United States Patent
Kidoguchi et al.

(10) Patent No.: US 10,104,673 B2
(45) Date of Patent: Oct. 16, 2018

(54) COMMUNICATION APPARATUS, COMMUNICATION SYSTEM, CONTROL METHOD, AND STORAGE MEDIUM ON WHICH COMMUNICATION PROGRAM HAS BEEN STORED

(71) Applicant: NEC CORPORATION, Tokyo (JP)

(72) Inventors: Emiko Kidoguchi, Tokyo (JP); Shigeomi Oshiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 21 days.

(21) Appl. No.: 15/023,533

(22) PCT Filed: Sep. 11, 2014

(86) PCT No.: PCT/JP2014/004674
§ 371 (c)(1),
(2) Date: Mar. 21, 2016

(87) PCT Pub. No.: WO2015/045305
PCT Pub. Date: Apr. 2, 2015

(65) Prior Publication Data
US 2016/0212751 A1 Jul. 21, 2016

(30) Foreign Application Priority Data
Sep. 27, 2013 (JP) ................. 2013-200683

(51) Int. Cl.
H04W 72/08 (2009.01)
H04W 28/02 (2009.01)
H04W 72/12 (2009.01)
(52) U.S. Cl.
CPC ..... H04W 72/082 (2013.01); H04W 28/0236 (2013.01); H04W 72/1226 (2013.01)

(58) Field of Classification Search
CPC ......... H04W 28/0236; H04W 28/0231; H04W 72/1226; H04W 72/1263
See application file for complete search history.

(56) References Cited

U.S. PATENT DOCUMENTS 6,011,970 A * 1/2000 McCarthy ............. H04W 16/02
455/436
8,848,521 B1 * 9/2014 Duff ....................... H04L 5/0091
370/229
(Continued)

FOREIGN PATENT DOCUMENTS

| CN | 102598750 | 7/2012 |
|---|---|---|
| CN | 102740402 | 10/2012 |

(Continued)

OTHER PUBLICATIONS

International Search Report, PCT/JP2014/004674, dated Dec. 9, 2014.
(Continued)

Primary Examiner — Christopher Crutchfield
(74) Attorney, Agent, or Firm — Young & Thompson

(57) ABSTRACT

Provided is a more appropriate determination method in determining radio resources with which interference has occurred. A communication apparatus, which uses a radio resource group including a plurality of radio resources, includes: a comparison unit that makes mutual comparison of the interference powers of at least two of a plurality of radio resources; and a determination unit that determines, on the basis of a result of the comparison made by the comparison unit, whether interference has occurred with the radio resources compared by the comparison unit.

17 Claims, 15 Drawing Sheets

(56) References Cited

U.S. PATENT DOCUMENTS

| 9,100,923 | B2 | 8/2015 | Yamazaki |
| 2010/0124181 | A1 | 5/2010 | Hosein |
| 2010/0322202 | A1 | 12/2010 | Ohta |
| 2012/0231746 | A1 | 9/2012 | Yamaaki |
| 2014/0029553 | A1 | 1/2014 | Li et al. |

FOREIGN PATENT DOCUMENTS

| JP | 2008-278263 | 11/2008 |
| JP | 2011-166685 | 8/2011 |
| JP | 2012-124856 | 6/2012 |
| WO | WO 2009/123163 | 10/2009 |
| WO | WO 2011/055841 | 5/2011 |

OTHER PUBLICATIONS

Extended European Search Report—EP 14 84 8363—dated Apr. 20, 2017.
Japanese Official Action—2015-538872—dated May 16, 2017.
Chinese Official Action—201480052960.0—dated Jun. 5, 2018.

\* cited by examiner

Fig. 8

| RB | $RB_0$ | $RB_1$ | ... | $RB_{n-1}$ | $RB_n$ | $RB_{n+1}$ | ... | $RB_{k-1}$ | $RB_k$ |
|---|---|---|---|---|---|---|---|---|---|
| INTERFERENCE POWER (dBm) | 20 | 18 | | 32 | 50 | 31 | | 20 | 21 |

Fig. 9

| RB | RB$_0$ | RB$_1$ | ... | RB$_{n-1}$ | RB$_n$ | RB$_{n+1}$ | ... | RB$_{k-1}$ | RB$_k$ |
|---|---|---|---|---|---|---|---|---|---|
| WHETHER INTERFERENCE HAS OCCURRED | NO | NO | | NO | YES | NO | | NO | NO |
| INTERFERENCE POWER (dBm) | 20 | 18 | | 32 | 50 | 31 | | 20 | 21 |

Fig. 11

| RB | $RB_0$ | $RB_1$ | ... | $RB_{n-1}$ | $RB_n$ | $RB_{n+1}$ | ... | $RB_{k-1}$ | $RB_k$ |
|---|---|---|---|---|---|---|---|---|---|
| DIFFERENCE FROM INTERFERENCE POWER OF $RB_1$ (dBm) | 2 | 0 | | 14 | 32 | 13 | | 2 | 3 |

Fig. 12

| RB | $RB_0$ | $RB_1$ | ... | $RB_{n-1}$ | $RB_n$ | $RB_{n+1}$ | ... | $RB_{k-1}$ | $RB_k$ |
|---|---|---|---|---|---|---|---|---|---|
| RATIO TO INTERFERENCE POWER OF $RB_0$ | 1.00 | 0.90 | | 1.60 | 2.50 | 1.55 | | 1.00 | 1.05 |

COMMUNICATION APPARATUS, COMMUNICATION SYSTEM, CONTROL METHOD, AND STORAGE MEDIUM ON WHICH COMMUNICATION PROGRAM HAS BEEN STORED

TECHNICAL FIELD

The present invention relates to a communication apparatus, a communication system, a control method and a storage medium for storing a communication program for properly determining a radio resource where interference has occurred.

BACKGROUND ART

A radio base station generally allocates a radio resource to a radio terminal and performs wireless communication with this radio terminal. Radio waves are used in the wireless communication, which could cause occurrence of interference. The interference is a state that a plurality of radio waves are overlapped and turned to be different when those radio waves are separately transmitted. For example, when each of two different radio base stations uses the same radio resource in the wireless communication, interference could occur at this radio resource.

An example of a method for determining whether interference has occurred at a certain radio resource in the wireless communication is a determination method described in PTL 1.

PTL 1 describes a method where a radio base station measures an interference power on a resource block basis and determines whether large interference has occurred by comparing a value obtained by multiplying the interference power by the traffic volume with a threshold.

CITATION LIST

Patent Literature

[PTL 1] International Publication No. WO2011/055841

SUMMARY OF INVENTION

Technical Problem

The method described in PTL 1, however, has a problem that it is difficult to properly determine the occurrence of interference when an inadequate threshold is set. For example, there is a problem that it is determined that interference has not occurred in a resource block where interference has actually occurred when a set threshold is too large.

Accordingly, an objective of the present invention is to provide a more proper determination method for determining a radio resource where interference has occurred.

Solution to Problem

A communication apparatus of the present invention which uses a radio resource group comprising a plurality of radio resources, comprises:
comparison means for mutually comparing interference powers of at least two radio resources of the plurality of radio resources; and
determination means for determining whether interference has occurred at the radio resources compared by the comparison means based on comparison results of the comparison means.

A communication system of the present invention comprises:
a communication apparatus for using a radio resource group comprising a plurality of radio resources; and
another communication apparatus communicable with the communication apparatus;
wherein the communication apparatus comprises:
comparison means for mutually comparing interference powers of at least two radio resources of the plurality of radio resources which are used for communication with another communication apparatus; and
determination means for determining whether interference has occurred at the radio resources compared by the comparison means based on comparison results of the comparison means.

A control method of the present invention for controlling a communication apparatus for using a radio resource group comprising a plurality of radio resources, comprises:
mutually comparing interference powers of at least two radio resources of the plurality of radio resources; and
determining whether interference has occurred at the compared radio resources based on a result of the comparison.

A storage medium for storing a communication program of the present invention for allowing a computer to control a communication apparatus for using a radio resource group comprising a plurality of radio resources,
the communication program for having the computer execute the processes of:
mutually comparing interference powers of at least two radio resources of the plurality of radio resources; and
determining whether interference has occurred at the compared radio resources based on results of the process.

Advantageous Effects of Invention

With the present invention, a radio resource where interference has occurred can be more properly determined.

BRIEF DESCRIPTION OF DRAWINGS

FIG. 8 is a table showing an example of information on interference powers of respective resource blocks.

FIG. 9 is a table showing an example of determination results saved in a memory 50.

FIG. 11 is a diagram showing an example of comparison results.

FIG. 12 is a diagram showing an example of comparison results.

DESCRIPTION OF EMBODIMENTS

First Exemplary Embodiment

Figure 1:
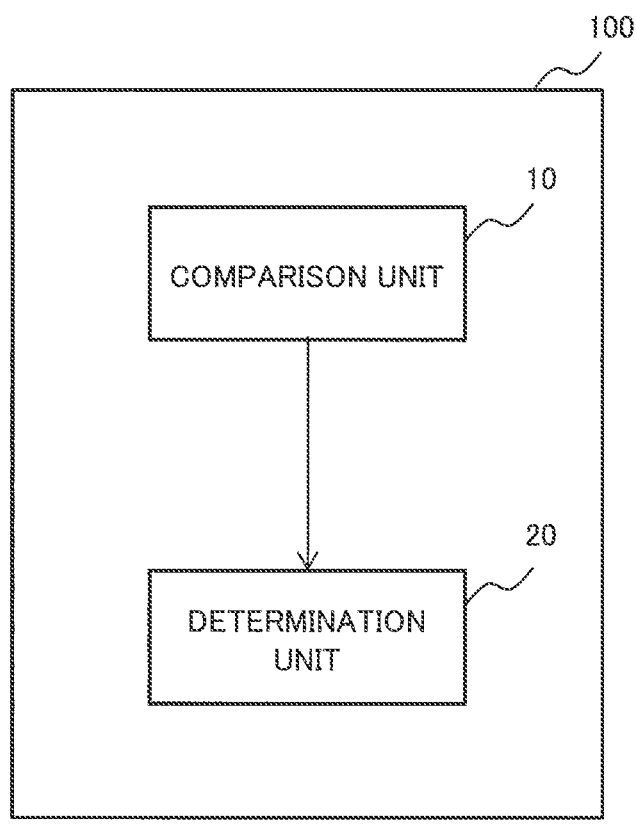
FIG. 1 is a block diagram of a communication apparatus related to the first exemplary embodiment.

FIG. 1 shows a configuration of a communication apparatus in the first exemplary embodiment.

The communication apparatus 100 uses a plurality of radio resources. In this description, a group of radio resources which include a plurality of radio resources used by the communication apparatus 100 is referred to as a radio resource group. Here, these radio resources may be ones that have at least a predetermined frequency bandwidth. For example, the radio resources may be a resource block that is divided into time and frequency domains. The radio resources may be also a resource block having a three-dimensional structure which is made of time, frequencies and space domains (for example, antenna selection). Further, a resource block having this three-dimensional structure is realized by Multiple-Input and Multiple-Output (MIMO). Further, the resource block may be also radio resources having a three-dimensional structure which is made of time, frequencies and codes. The radio resources having this three-dimensional structure are realized, for example, by W-CDMA (Wideband Code Division Multiple Access).

The communication apparatus 100 has at least a comparison unit 10 and a determination unit 20. The comparison unit 10 compares mutual interference powers of at least two radio resources of a plurality of radio resources and outputs comparison results which are results of the comparison. The determination unit 20 inputs the comparison results and determines whether interference has occurred at the radio resources compared by the comparison unit 10 based on the comparison results.

Next, behaviors of the communication apparatus 100 in this exemplary embodiment are explained.

Firstly, the comparison unit 10 compares mutual interference powers of at least two radio resources of a plurality of radio resources and outputs comparison results which are results of the comparison. Here, as long as these comparison results represent the results of the comparison, details of their contents are not important.

Next, the determination unit 20 determines whether interference has occurred at the radio resources compared by the comparison unit 10 based on the comparison results.

As mentioned above, the communication apparatus 100 in this exemplary embodiment determines whether interference has occurred at the radio resources included in the radio resource group based on the comparison results which are results of comparing the interference powers of at least two radio resources. Therefore, with the communication apparatus 100 in this exemplary embodiment, a radio resource where interference has occurred can be properly determined.

Second Exemplary Embodiment

Figure 2:
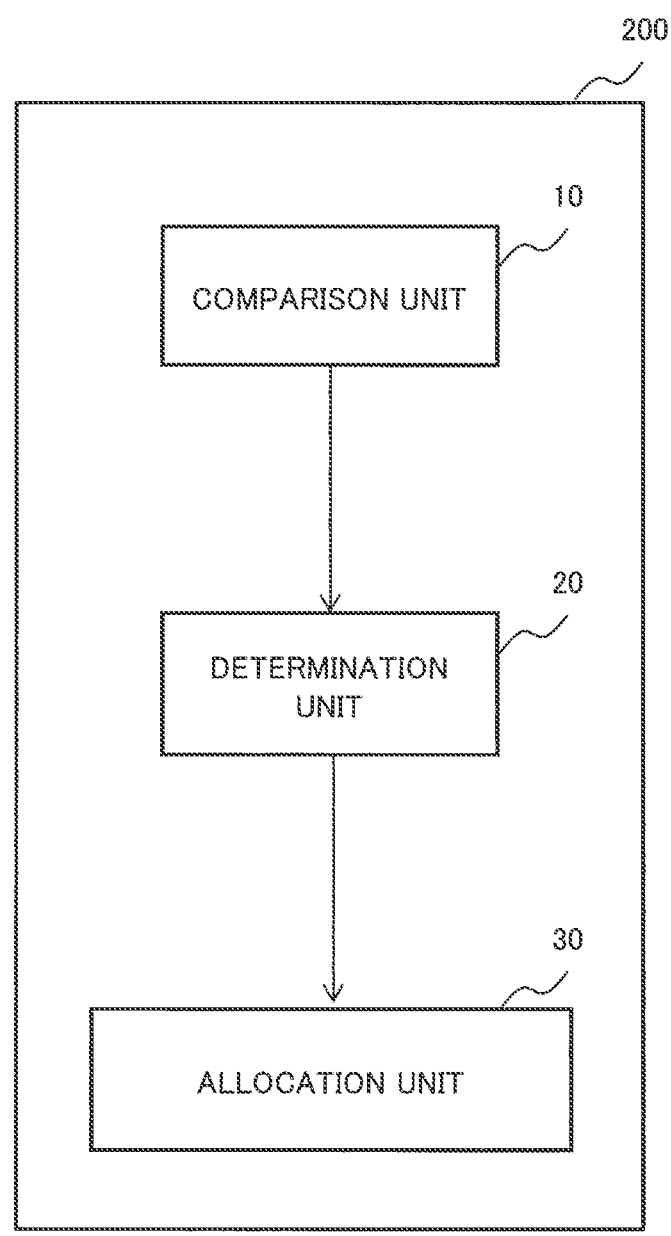
FIG. 2 is a block diagram of a communication apparatus related to the second exemplary embodiment.

FIG. 2 shows a configuration of a communication apparatus in the second exemplary embodiment.

The communication apparatus 200 uses a plurality of radio resources. A group of radio resources which include a plurality of radio resources used by the communication apparatus 200 is referred to as a radio resource group.

The communication apparatus 200 has at least a comparison unit 10, a determination unit 20 and an allocation unit 30. The comparison unit 10 and the determination unit 20 are as stated in the first exemplary embodiment. The determination unit 20 in this exemplary embodiment outputs information showing whether interference has occurred at the radio resources compared by the comparison unit 10 as determination results. The allocation unit 30 inputs the determination results and allocates radio resources to another communication apparatus based on the determination results.

Next, behaviors of the communication apparatus 200 in this exemplary embodiment are explained.

Behaviors of the comparison unit 10 and the determination unit 20 are as stated in the first exemplary embodiment.

The determination unit 20 in this exemplary embodiment outputs information showing whether interference has occurred at the radio resources compared by the comparison unit 10 as determination results. The determination results which are output from the determination unit may be only the information to identify a radio resource where interference has occurred, only the information to identify a radio resource where interference has not occurred or the information to identify whether interference has occurred per radio resource.

Next, the allocation unit 30 allocates the radio resources where interference has not occurred to another communication apparatus based on the determination results.

The interference powers may be computed by the communication apparatus 200 or notified by another communication apparatus which differs from the communication apparatus 200.

As mentioned above, the communication apparatus 200 in this exemplary embodiment allocates radio resources to another communication apparatus based on the determination results of whether interference has occurred at the radio resources included in a radio resource group. Therefore, the communication apparatus 200 in this exemplary embodiment can allocate the radio resources where interference has not occurred to another communication apparatus.

Third Exemplary Embodiment

Figure 3:
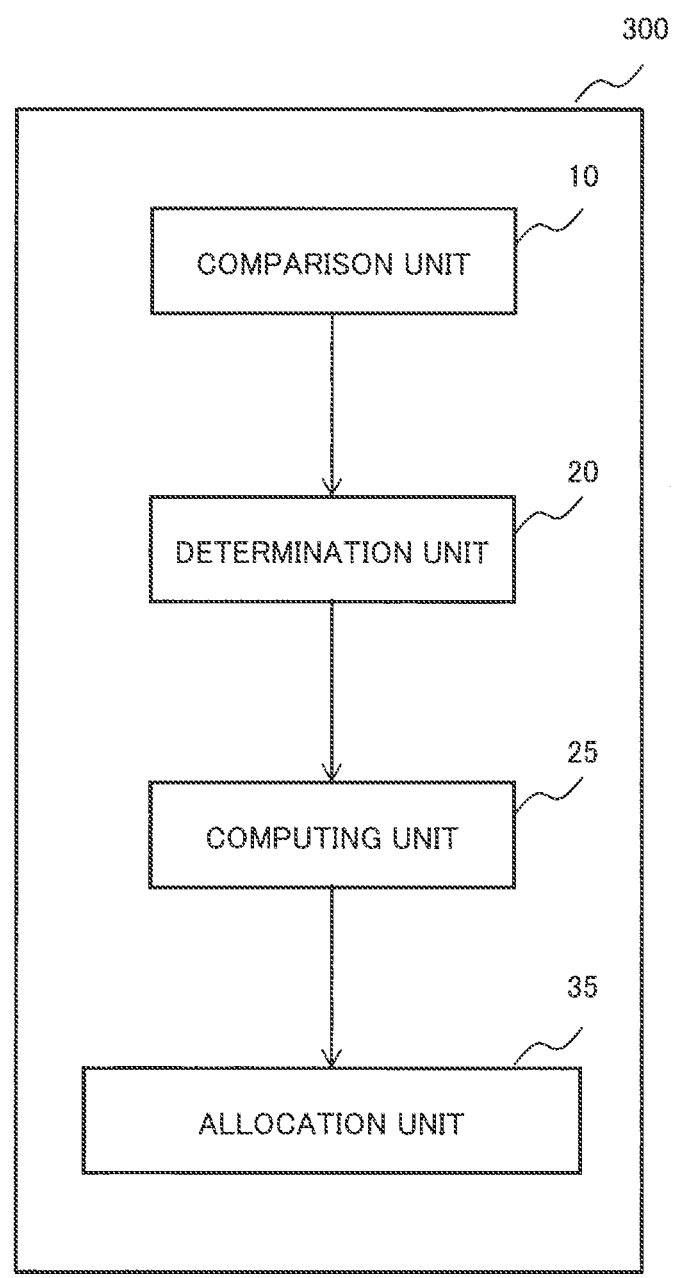
FIG. 3 is a block diagram of a communication apparatus related to the third exemplary embodiment.

FIG. 3 shows a communication apparatus in the third exemplary embodiment.

The communication apparatus 300 uses a plurality of radio resources. A group of radio resources which include a plurality of radio resources used by the communication apparatus 300 is referred to as a radio resource group.

The communication apparatus 300 has at least a comparison unit 10, a determination unit 20, a computing unit 25 and an allocation unit 35. The comparison unit 10 and the determination unit 20 are as stated in the first exemplary embodiment. The determination unit 20 in this exemplary embodiment outputs information showing whether interference has occurred at the radio resources compared by the comparison unit 10 and one showing values of the interference which has occurred at the compared radio resources as determination results. The computing unit 25 computes a mean value of interference powers of a plurality of radio resources included in the radio resource group based on the determination results input by the determination unit 20.

Next, behaviors of the communication apparatus 300 in this exemplary embodiment are explained.

Behaviors of the comparison unit 10 and the determination unit 20 are as stated in the first exemplary embodiment.

After the determination, the determination unit 20 in this exemplary embodiment outputs information showing whether interference has occurred at the radio resources compared by the comparison unit 10 and one showing the strength of the interference powers occurring at the compared radio resources as determination results.

Next, the computing unit 25 computes a mean value of interference powers of a plurality of radio resources included in the radio resource group based on the determination results. At the time, the computing unit 25 excludes interference powers of the radio resources where it is determined that interference has occurred to compute a mean value.

The allocation unit 35 allocates radio resources to another communication apparatus based on the computing results output from the computing unit 25. At the time, the allocation unit 35 does not allocate the radio resources which are determined to be under interference to another communication apparatus.

Figure 4:
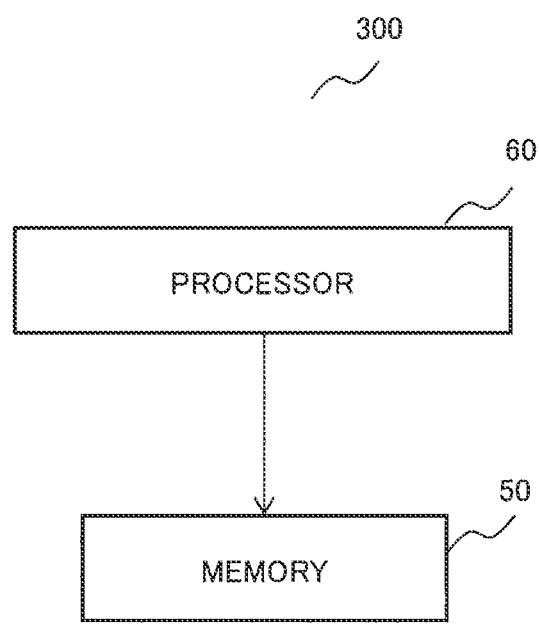
FIG. 4 is a block diagram of a communication apparatus related to the first to third exemplary embodiments.

Here, the communication apparatus in the third exemplary embodiment of the present exemplary embodiments is now explained more specifically with reference to FIG. 4.

A configuration in FIG. 4 is nothing more than one aspect of the present exemplary embodiments. The present exemplary embodiments can be performed through various means. For example, the present exemplary embodiments can be performed with hardware, software or any combination thereof. Besides, the present exemplary embodiments may be also applied to other exemplary embodiments.

The communication apparatus 300 has a memory 50 and a processor 60.

Figure 5:
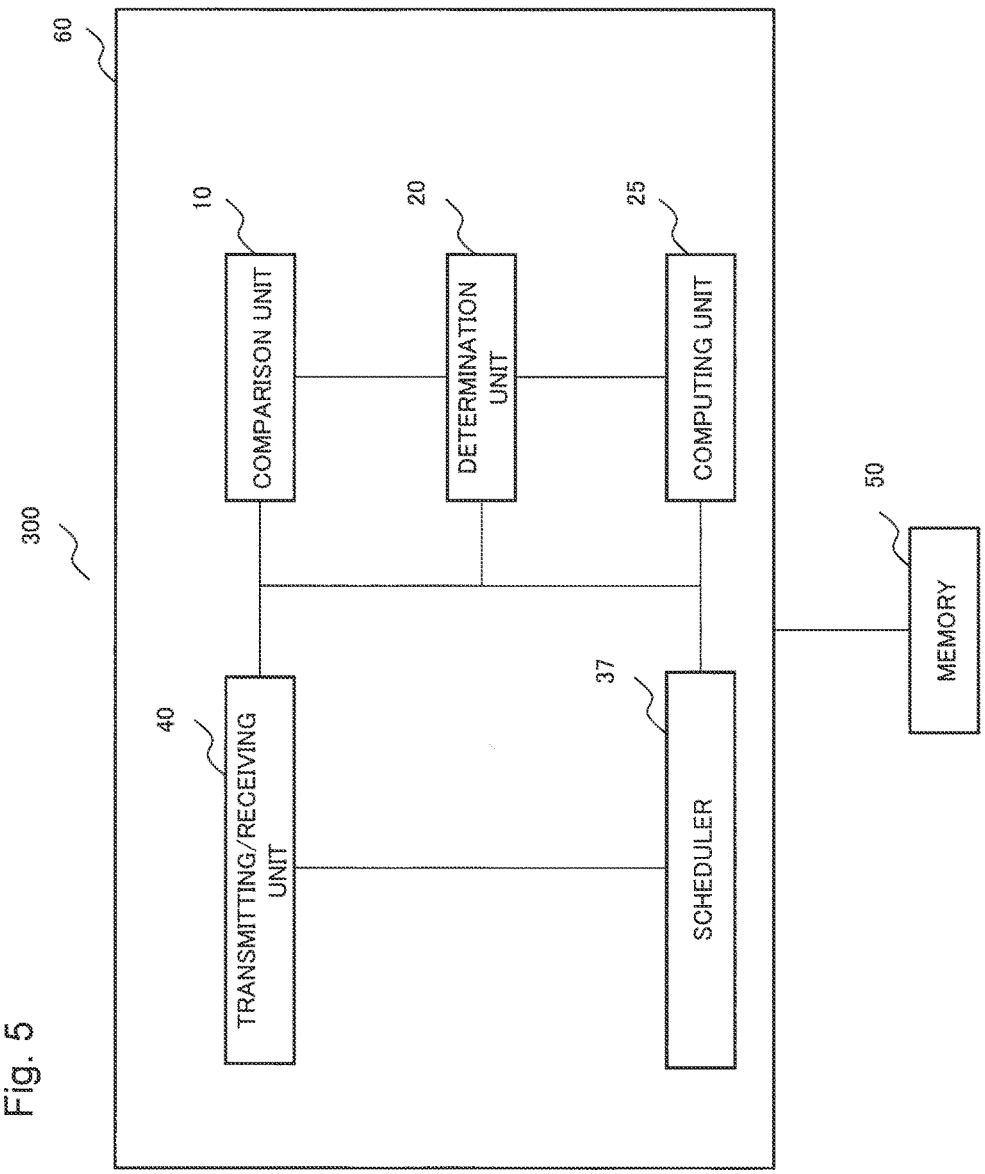
FIG. 5 is a block diagram of a communication apparatus related to the first to third exemplary embodiments.

FIG. 5 is an example of specifically showing a configuration of the processor 60 in FIG. 4. As shown in FIG. 5, the processor 60 has functions of the comparison unit 10, the determination unit 20 and the computing unit 25 shown in the foregoing exemplary embodiments and ones of a scheduler 37 and a transmitting/receiving unit 40. It is noted that the memory 50 is configured separately from the processor 60 in the example shown in FIG. 5, but the memory 50 may be included in the processor 60. In this case, the memory 50 is included in at least one of the comparison unit 10, the determination unit 20 and the computing unit 25. For the explanation below, FIG. 5 is referenced.

Hereinafter, for the purpose of illustration, a resource block (RB) which is one of radio resources is used for the explanation in place of a "radio resource", which does not mean that the present embodiment is applied only to resource block.

Also, for illustrative purposes, a radio resource is replaced with a resource block and then a radio resource group is replaced with all bands that the communication apparatus 300 uses.

Figure 6:
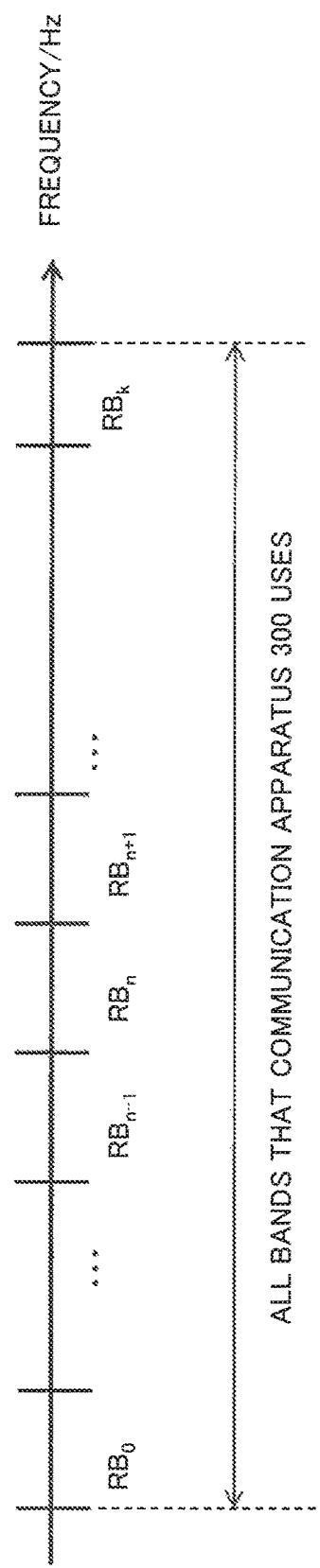
FIG. 6 is a diagram showing an example of dividing all bands that a communication apparatus uses into k+1 resource blocks.

FIG. 6 shows an example where all bands used by the communication apparatus 300 are divided into k+1 resource blocks from $RB_0$ to $RB_k$.

Figure 7:
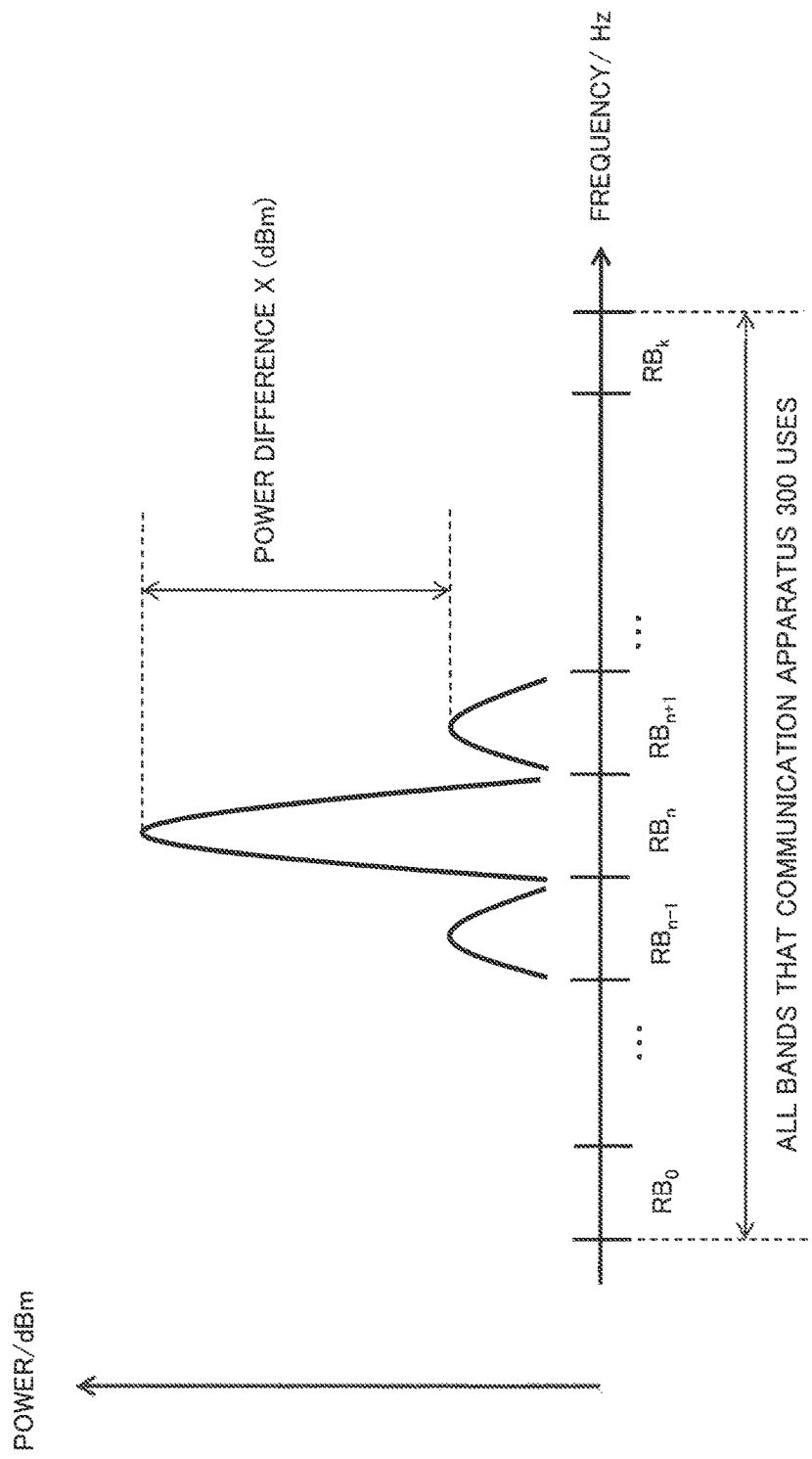
FIG. 7 is a diagram showing an example of an occurrence situation of interference powers across the resource blocks of FIG. 6.

FIG. 7 shows an example of an occurrence situation of interference powers in each resource block shown in FIG. 6. In the following description, it is explained that large interference has occurred only at $RB_n$ in all bands that the communication apparatus 300 uses.

The transmitting/receiving unit 40 computes interference powers of respective resource blocks, using received signals. It is noted that interference powers computed by the other end of communication may be used as ones of resource blocks. In this case, the transmitting/receiving unit 40 receives information on interference powers of respective resource blocks.

It is noted that these received signals are, for example, pilot signals. The pilot signals are signals which are transmitted in a certain defined bit (chip in CDMA) pattern. Because the pilot signals are ones with a certain predetermined pattern, the aforementioned communication apparatus 300 which receives these signals can measure their received or interference powers. As an example of the pilot signals, reference signals are used in Long Term Evolution (LTE). The reference signals are defined according to their reference signal sequences in the frequency domain. For example, Zadoff-Chu (ZC) sequences, which are one of CAZAC sequences, are used because it is desirable that the reference signal sequences are uniform in the frequency characteristics and they have good autocorrelation and cross-correlation characteristics.

FIG. 8 shows an example of information on interference powers of respective resource blocks. It is noted that a form of information is not limited to the one in FIG. 8.

The comparison unit 10 compares the mutual interference powers of at least two resource blocks of k+1 resource blocks from $RB_0$ to $RB_k$.

This comparison of the comparison unit 10 is based on a difference in interference powers of two resource blocks. For example, the comparison unit 10 obtains a difference between interference powers of $RB_{n-1}$ and $RB_n$, and outputs a comparison result that the difference between the interference powers of $RB_{n-1}$ and $RB_n$ is X (dBm).

The comparison results are saved in the memory 50.

Next, the determination unit 20 reads the comparison results from the memory 50 and starts determination. For example, the determination unit 20 reads the comparison result that the difference between the interference powers of $RB_{n-1}$ and $RB_n$ is X (dBm), and outputs the information that interference has occurred at $RB_n$ and the one showing a value of the interference power of $RB_n$ as the determination results when the comparison result is over a predetermined value.

Also, at the determination unit 20, the predetermined value may be preliminarily set or vary according to circumstances. Here, these circumstances mean, for example, the communication environments, which refer to reception qualities or throughputs, such as CQI (Channel Quality Indicator), RSRP (Reference Signal Received Power), RSRQ (Reference Signal Received Quality), and path loss.

The determination results are saved in the memory 50.

FIG. 9 shows an example of the determination results saved in the memory 50. The determination results may include interference power values of respective resource blocks, information showing the strength of interference which has occurred at each resource block and information about others including interference powers and determination methods. It may be also shown in one bit of information whether interference has occurred. For example, the configuration may be such that, if the bit is "0", it is shown that interference has occurred at a corresponding resource block, and if the bit is "1", it is shown that interference has not occurred at a corresponding resource block.

Next, the computing unit 25 reads the determination results from the memory 50 and starts computing a mean value of interference powers of a plurality of resource blocks. At the time, the computing unit 25 excludes interference powers of the resource blocks which the determination unit 20 determined to be under interference.

In this computation, the computing unit 25 may also exclude the interference powers of respective resource blocks next to the one which is determined to be under interference based on the determination results from the mean value computation. For example, if interference has occurred at $RB_n$, the interference powers of $RB_{n-1}$ and $RB_{n+1}$ may be also excluded from the mean value computation.

In addition, at the computing unit 25, the number of excluded resource blocks from the mean value calculation may be preliminarily set or changed according to circumstances. Here, these circumstances mean, for example, the communication environments, which refer to reception qualities or throughputs, such as CQI (Channel Quality Indicator).

The computing unit 25 may compute estimate values of SIR (Signal-to-Interference Ratio) per resource block using the interference power values.

In the SIR estimate value computation, the SIR estimate values may be corrected according to interference power strength of resource blocks. For example, if the interference power strength of a resource block is over a predetermined value, the computed SIR estimate value may be corrected with a value according to the strength of the interference power which has occurred at the resource block (such as a value proportional to the interference power strength). Also, for example, for a resource block which is determined to be under interference based on the determination results, its computed SIR estimate value may be corrected with a value according to the strength of the interference power which has occurred at the resource block (such as a value proportional to the interference power strength).

The computing unit 25 outputs a mean value of interference powers and SIR estimate values, both of which are the computing results.

The computing results are saved in the memory 50.

The scheduler 37 reads the computing results from the memory 50 and allocates a resource block to another communication apparatus.

Figure 10:
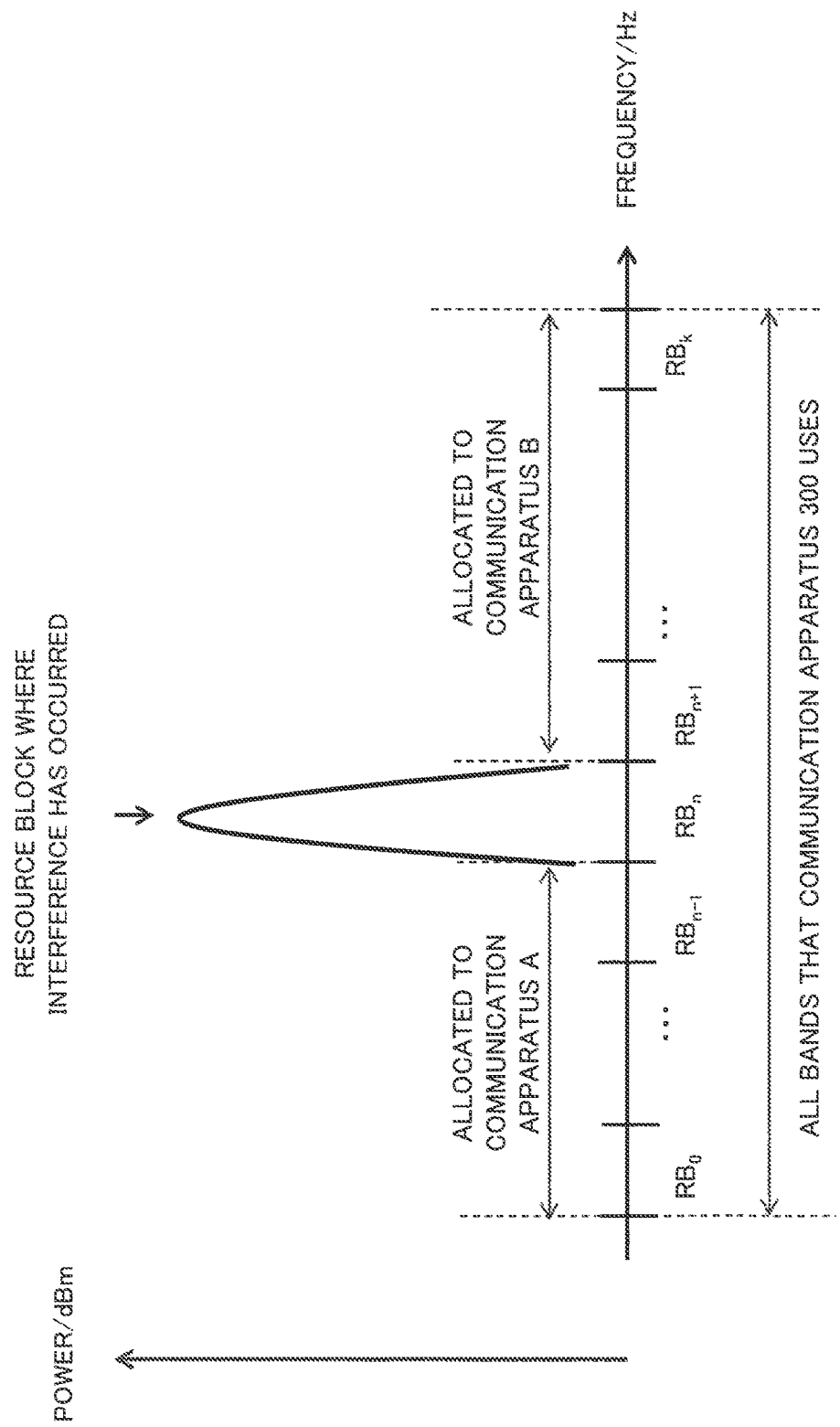
FIG. 10 is a diagram showing an example of allocation of resource blocks.

FIG. 10 shows an example of allocation of resource blocks. The scheduler 37 may allocate different communication apparatuses respectively or same communication apparatus for each side of resource blocks, which is determined to be under interference.

The scheduler 37 may refer to interference powers of respective resource blocks when it allocates a resource block to another communication apparatus.

The present exemplary embodiments are specifically explained above based on the preferred exemplary embodiments, but it goes without saying that the present exemplary embodiments are not limited to the above and various changes or addition may be made without departing from its substance. The details are described below.

(Comparison Method)

For example, in the first to third exemplary embodiments, the comparison unit 10 compares the interference powers of at least two radio resources of a plurality of radio resources. Here, a specific example of the comparison at the comparison unit is now explained.

It is noted that an example of the comparison method of the comparison unit 10 is a method for comparing an interference power of the radio resource which is a target for comparison with the interference power/powers of one or a plurality of radio resource/resources which is/are the other side of the comparison target/targets. In this case, the comparison unit 10 changes targets of comparison to compare when it finishes comparing radio resources which are targets of comparison. For example, after the comparison unit 10 compares the target of comparison with the other target, it may interchange the radio resources from the target to the other target of comparison and from the other target to the target of comparison. The determination unit 20 in this case determines whether interference has occurred at the targets of comparison.

For example, the comparison at the comparison unit 10 may be based on obtaining a difference between a minimum value of interference powers in a radio resource group and an interference power of a compared radio resource.

This comparison method is specifically explained in FIG. 8.

In FIG. 8, an interference power value of $RB_1$ is the minimum value of interference powers in all bands. In this case, differences between an interference power value of $RB_1$ and ones of other RBs are obtained respectively. FIG. 11 shows results of the obtained differences.

In this case, the results whether the obtained differences are over a predetermined value may act as a benchmark of the determination method.

Besides, the comparison at the comparison unit 10 may be also based on obtaining a ratio of mutual interference powers of compared radio resources.

This comparison method is specifically explained in FIG. 8.

For example, in FIG. 8, ratios of an interference power value of $RB_0$ to ones of other RBs are obtained respectively. FIG. 12 shows results of the obtained ratios.

In this case, whether the results of the obtained ratios are over a predetermined value may act as a benchmark of the determination method.

(Determination Method)

Figure 13:
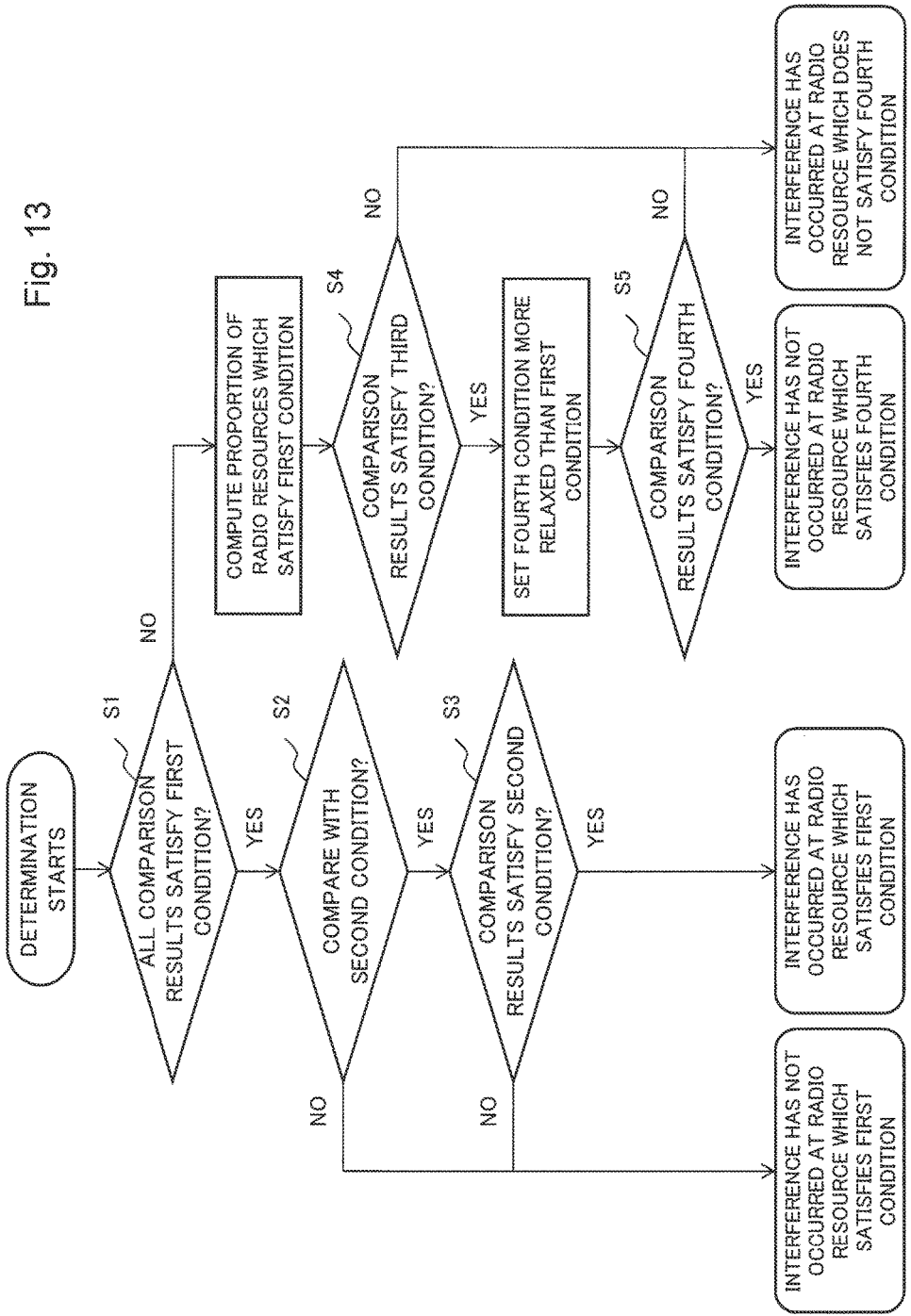
FIG. 13 is a flowchart showing a specific example of a determination method of a determination unit.

Besides, in the first to third exemplary embodiments, the determination unit 20 determines, based on the comparison results, whether interference has occurred at radio resources included in the radio resource group which is compared at the comparison unit 10. A specific example of the determination method at the determination unit 20 is now explained with reference to FIG. 13.

Here, this explains an example where the comparison at the comparison unit 10 is based on obtaining a difference of mutual interference powers of compared radio resources.

Firstly, it is determined whether all the comparison results satisfy the first condition (S1). Here, this first condition is one that a difference of the interference powers is the first predetermined value or less. The first predetermined value may be a fixed or variation value. In the case of a variation value, for example, it may be a value which changes according to communication environments.

If all the comparison results satisfy the first condition (S1: YES), it is selected whether the comparison results are determined with the second condition (S2). If the comparison results are not determined with the second condition (S2: NO), the determination ends and it is determined that interference has not occurred at the radio resources which satisfy the first condition.

Here, this second condition is one that the minimum value of interference powers shown by the radio resources included in the radio resource group is the second predetermined value or more. The second predetermined value may be a fixed or variation value. In the case of a variation value, for example, it may be a value which changes according to communication environments.

If the comparison results satisfy the first condition (S1: YES), the comparison results are determined with the second condition (S2: YES) and the comparison results satisfy the second condition (S3: YES), it is determined that interference has occurred at a radio resource which satisfies the first condition.

If the comparison results satisfy the first condition (S1: YES), the comparison results are determined with the second condition (S2: YES) and the comparison results do not satisfy the second condition (S3: NO), it is determined that interference has not occurred at a radio resource which satisfies the first condition.

If at least one of all the comparison results does not satisfy the first condition (S1: NO), the proportion of the radio resources which satisfy the first condition in the radio resource group is computed. Then it is determined whether the proportion of the radio resources which satisfy the first condition in the radio resource group satisfies the third condition.

Here, this third condition is one that the proportion of the radio resources which satisfy the first condition in the radio resource group is the second predetermined value or less.

If the proportion of the radio resources which satisfy the first condition in the radio resource group does not satisfy the third condition (S4: NO), the determination ends and it is determined that interference has occurred at a radio resource which does not satisfy the first condition.

If the proportion of the radio resources which satisfy the first condition in the radio resource group satisfies the third condition (S4: YES), a larger value than the first predetermined value used in the first condition is set as the third predetermined value and the fourth condition that "the comparison results are the third predetermined value or more" is set.

Then if the comparison results do not satisfy the fourth condition (S5: NO), the determination ends and it is determined that interference has occurred at a radio resource which does not satisfy the fourth condition.

By contrast, if the comparison results satisfy the fourth condition (S5: YES), the determination ends and it is determined that interference has not occurred at radio resources which satisfy the fourth condition.

(Specific Examples of Communication Apparatus and Another Communication Apparatus)

For example, the communication apparatus in the first to third exemplary embodiments may be a base station. In this case, another communication apparatus is a target to which the base station allocates radio resources, such as a mobile station, a femtocell base station and a microcell base station.

Figure 14:
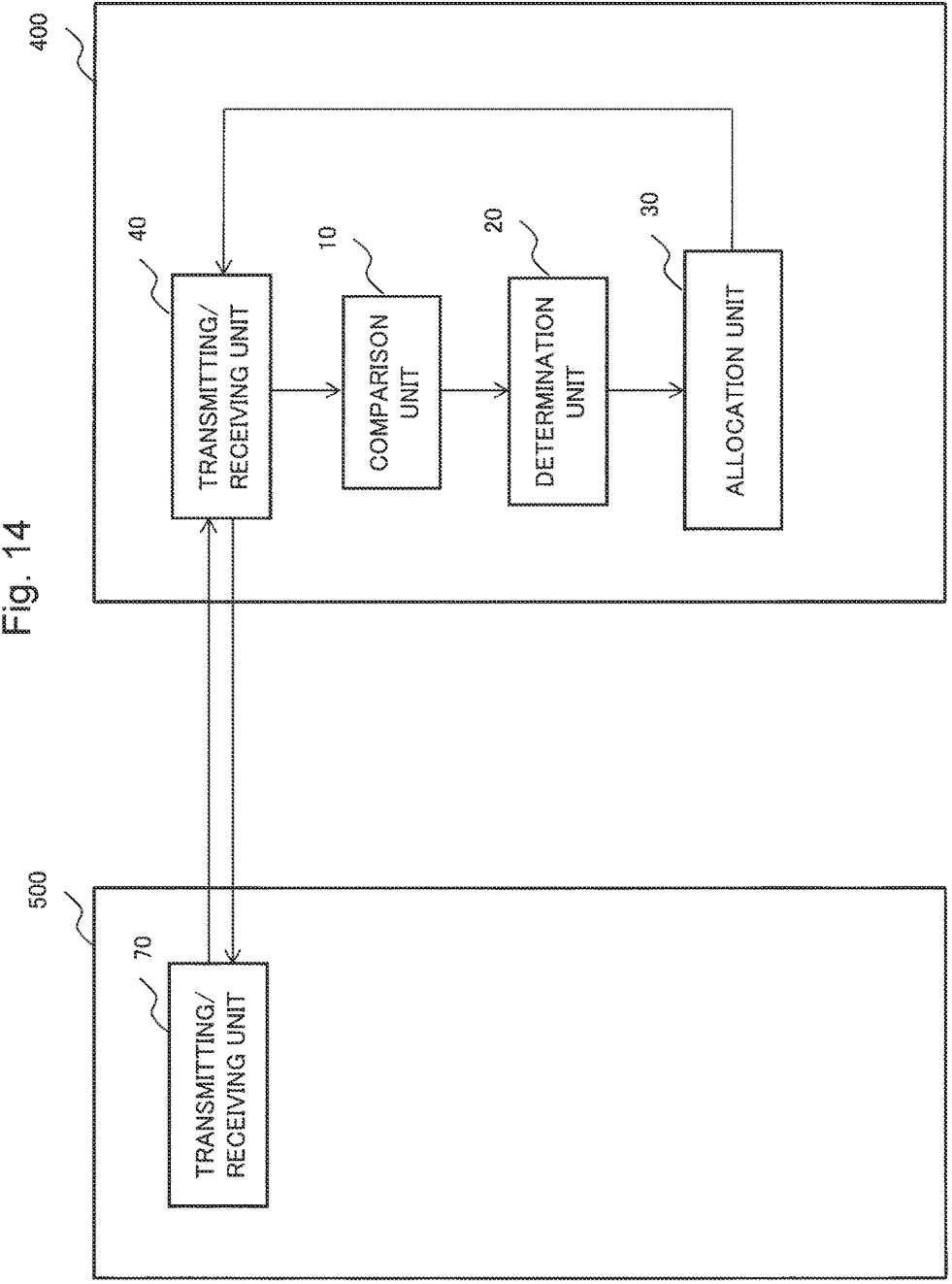
FIG. 14 is a block diagram showing a configuration example of a communication system of the first to third exemplary embodiments.

FIG. 14 shows a configuration example of a communication system of the first to third exemplary embodiments. In the configuration example in FIG. 14, a communication system where a communication apparatus 400 and another communication apparatus 500 communicate over radio is configured. The communication apparatus 400 is configured with the comparison unit 10, the determination unit 20, the allocation unit 30 and a transmitting/receiving unit 40. Another communication apparatus 500 is configured with a transmitting/receiving unit 70. The transmitting/receiving unit 40 of the communication apparatus 400 and the transmitting/receiving unit 70 of another communication apparatus 500 receive or transmit information from or to each other.

The comparison unit 10 of the communication apparatus 400 mutually compares interference powers of at least two radio resources of a plurality of radio resources and outputs comparison results which are results of the comparison. The determination unit 20 inputs the comparison results, determines whether interference has occurred at the radio resources compared by the comparison unit 10 based on the comparison results and outputs information showing whether interference has occurred at the radio resources compared by the comparison unit 10 as determination results. The allocation unit 30 inputs the determination results and allocates radio resources to another communication apparatus 500 based on the determination results. The transmitting/receiving unit 40 of the communication apparatus 400 communicates with another communication apparatus 500 using the radio resources allocated to another communication apparatus 500 by the allocation unit 30.

Figure 15:
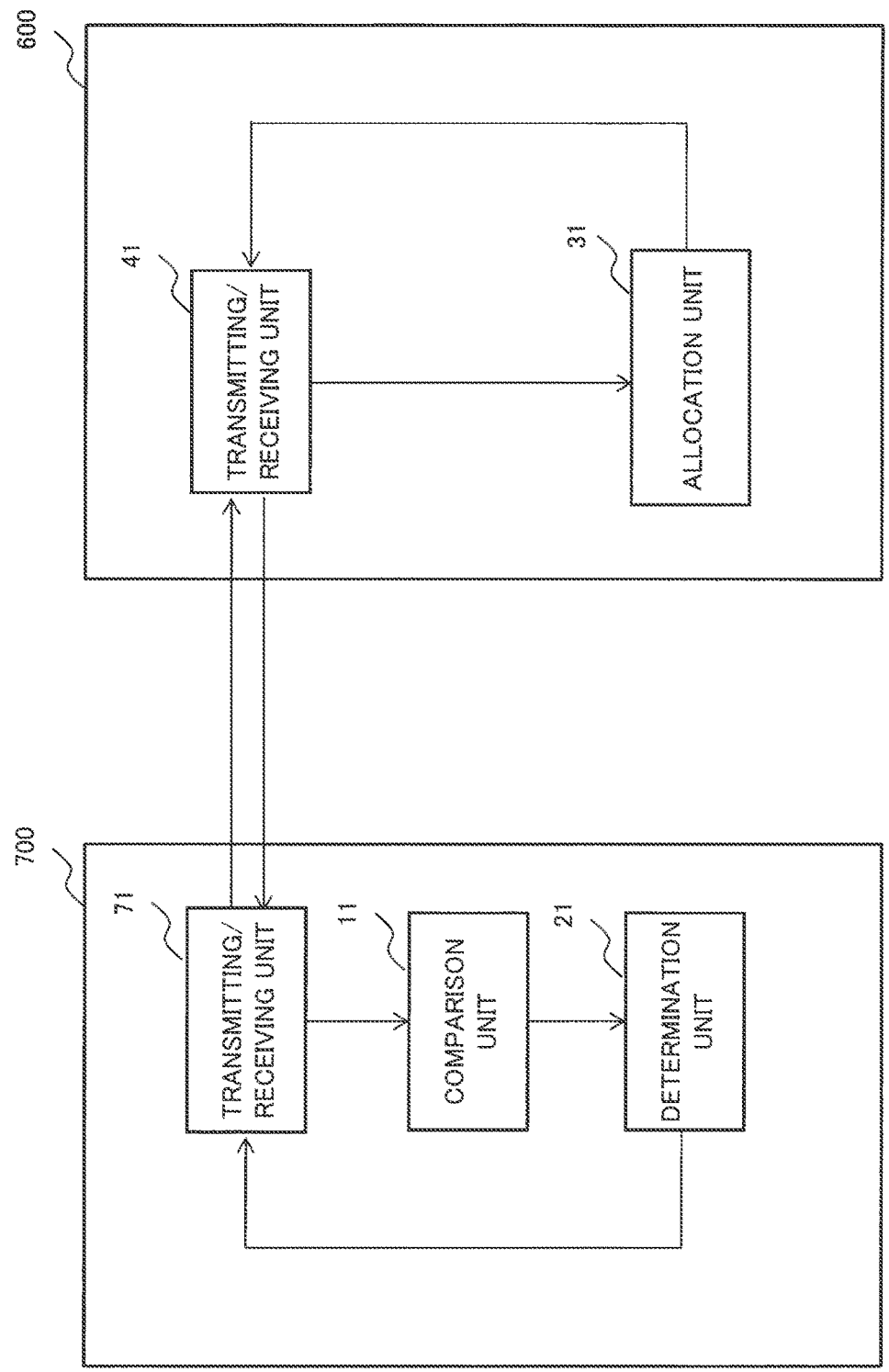
FIG. 15 is a block diagram showing a configuration example of a communication system of the first to third exemplary embodiments.

FIG. 15 shows another configuration example of a communication system of the first to third exemplary embodiments. In the configuration example in FIG. 15, wireless communication between a communication apparatus 600 and another communication apparatus 700 configures the communication system. The communication apparatus 600 is configured with an allocation unit 31 and a transmitting/receiving unit 41. Another communication apparatus 700 is configured with a comparison unit 11, a determination unit 21 and a transmitting/receiving unit 71. The transmitting/receiving unit 41 of the communication apparatus 600 and the transmitting/receiving unit 71 of another communication apparatus 700 receive or transmit information from or to each other.

The comparison unit 11 of another communication apparatus 700 mutually compares interference powers of at least two radio resources of a plurality of radio resources and outputs comparison results which are results of the comparison. The determination unit 21 inputs the comparison results, determines whether interference has occurred at the radio resources compared by the comparison unit 11 based on the comparison results and outputs information showing whether interference has occurred at the radio resources compared by the comparison unit 11 as determination results to the transmitting/receiving unit 71. The transmitting/receiving unit 71 of another communication apparatus 700 transmits the determination results to the transmitting/receiving unit 41 of the communication apparatus 600. The transmitting/receiving unit 41 of the communication apparatus 600 inputs the received determination results on the allocation unit 31 and allocates radio resources to another communication apparatus 700 based on the determination results. The transmitting/receiving unit 41 of the communication apparatus 600 communicates with another communication apparatus 700 using the radio resources allocated to another communication apparatus 700 by the allocation unit 31.

Also, each process of the foregoing exemplary embodiments may be executed by software. This means a computer program for performing each process may be read and executed by CPU (Central Processing Unit) included in a communication apparatus. If each process is performed by a program, the same processing details as the processes in the aforementioned exemplary embodiments can be done. In addition, the above program may be stored in a non-transitory medium, including a semiconductor storage, such as ROM (Read Only Memory), RAM (Random Access Memory) and a flash memory, an optical disk, a magnetic disk and a magnetic optical disk.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-200683, filed on Sep. 27, 2013, the disclosure of which is incorporated herein in its entirety by reference.

The whole or part of the exemplary embodiments disclosed above can be described as, but not limited to, the following supplementary notes.

(Supplementary Note 1)

A communication apparatus which uses a radio resource group comprising a plurality of radio resources, the communication apparatus comprising:

comparison means for mutually comparing interference powers of at least two radio resources of the plurality of radio resources; and determination means for determining whether interference has occurred at the radio resources compared by the comparison means based on comparison results of the comparison means.

(Supplementary Note 2)

The communication apparatus of supplementary note 1, wherein the determination means outputs information showing whether interference has occurred at the compared radio resources as determination results of the determination.

(Supplementary Note 3)

The communication apparatus of supplementary note 2, comprising allocation means for allocating a radio resource to another communication apparatus communicable with the communication apparatus based on the determination results.

(Supplementary Note 4)

The communication apparatus of supplementary note 2, comprising computing means for computing a mean value of interference powers of the plurality of radio resources included in the radio resource group based on the determination results.

(Supplementary Note 5)

The communication apparatus of any one of supplementary notes 2 to 4, wherein the determination results comprise information for identifying a radio resource where interference has occurred.

(Supplementary Note 6)

The communication apparatus of any one of supplementary notes 2 to 4, wherein the determination results comprise information according to strength of occurring interference.

(Supplementary Note 7)

The communication apparatus of any one of supplementary notes 1 to 6, wherein the comparison made by the comparison means is based on differences of the mutual interference powers of the plurality of radio resources.

(Supplementary Note 8)

The communication apparatus of any one of supplementary notes 1 to 6, wherein the comparison made by the comparison means is based on differences between a minimum interference power detected in the radio resource group and the interference powers of the plurality of radio resources.

(Supplementary Note 9)

The communication apparatus of any one of supplementary notes 1 to 6, wherein the comparison made by the comparison means is based on a ratio of the mutual interference powers of the plurality of radio resources.

(Supplementary Note 10)

The communication apparatus of any one of supplementary notes 1 to 9, wherein the determination of the determination means is one whether the comparison results satisfy a first condition.

(Supplementary Note 11)

The communication apparatus of supplementary notes 10, wherein the determination of the determination means is one whether the comparison results satisfy a second condition if the comparison results do not satisfy the first condition.

(Supplementary Note 12)

The communication apparatus of supplementary note 10 or 11, wherein the determination means calculates a radio resource count which is the number of radio resources determined to satisfy the first condition in comparison results and determines whether the comparison results satisfy a fourth condition if a proportion of the radio resource count to the number of the radio resources included in the radio resource group satisfies a third condition.

(Supplementary Note 13)

The communication apparatus of any one of supplementary notes 10 to 12, wherein the first condition is that the difference of the interference powers of the radio resources compared by the comparison means is a first predetermined value or more.

(Supplementary Note 14)

The communication apparatus of any one of supplementary notes 10 to 12, wherein the first condition is that the ratio of the interference powers of the radio resource compared by the comparison means is a first predetermined value or more.

(Supplementary Note 15)

The communication apparatus of supplementary note 11, wherein the second condition is that the minimum interference power detected in the radio resource group is a second predetermined value or more.

(Supplementary Note 16)

The communication apparatus of supplementary note 12, wherein the third condition is that the proportion is a predetermined value or more.

(Supplementary Note 17)

The communication apparatus of supplementary note 12, wherein the fourth condition is that the difference or the ratio of the interference powers of the radio resources compared by the comparison means is a third predetermined value or more and the third predetermined value is larger than the first predetermined value.

REFERENCE SIGNS LIST

100, 200, 300, 400, 500, 600, 700 Communication apparatus
10, 11 Comparison unit
20, 21 Determination unit
25 Computing unit
30, 35 Allocation unit
37 Scheduler
40, 41, 70, 71 Transmitting/receiving unit
50 Memory
60 Processor

The invention claimed is:

1. A communication apparatus which uses a radio resource group comprising a plurality of radio resources, the communication apparatus comprising:
   a comparison unit, implemented by a processor, that mutually compares interference powers of at least two radio resources of the plurality of radio resources; and
   a determination unit, implemented by the processor, that determines whether interference has occurred at the radio resources compared by the comparison unit based on comparison results of the comparison unit,
   wherein based on at least a first condition and a second condition, the determination unit determines:

that interference has not occurred at the radio resource which satisfies the first condition when the first condition is satisfied with all comparison results and the second condition is not satisfied with all comparison results; and that interference has occurred at the radio resource which satisfies the first condition when the first condition and the second condition are satisfied with all comparison results, and wherein:

the first condition is whether or not a difference value indicated by the comparison results is less than or equal to the first predetermined value, and the second condition is whether or not the value of the smallest interference powers indicated by the radio resources included in the radio resource group is equal to or more than the second predetermined value.

2. The communication apparatus of claim 1, wherein the determination unit outputs information showing whether interference has occurred at the compared radio resources as determination results of the determination.

3. The communication apparatus of claim 2, further comprising:

an allocation unit that allocates a radio resource to another communication apparatus communicable with the communication apparatus based on the determination results.

4. The communication apparatus of claim 3, wherein the determination results comprise information for identifying a radio resource where interference has occurred.

5. The communication apparatus of claim 4, wherein the comparison made by the comparison unit is based on differences of the mutual interference powers of the plurality of radio resources.

6. The communication apparatus of claim 3, wherein the comparison made by the comparison unit is based on differences of the mutual interference powers of the plurality of radio resources.

7. The communication apparatus of claim 2, further comprising:

a computing unit, implemented by the processor, that computes a mean value of interference powers of the plurality of radio resources included in the radio resource group based on the determination results.

8. The communication apparatus of claim 7, wherein the determination results comprise information for identifying a radio resource where interference has occurred.

9. The communication apparatus of claim 7, wherein the comparison made by the comparison unit is based on differences of the mutual interference powers of the plurality of radio resources.

10. The communication apparatus of claim 2, wherein the determination results comprise information for identifying a radio resource where interference has occurred.

11. The communication apparatus of claim 10, wherein the comparison made by the comparison unit is based on differences of the mutual interference powers of the plurality of radio resources.

12. The communication apparatus of claim 2, wherein the determination results comprise information according to strength of occurring interference.

13. The communication apparatus of claim 12, wherein the comparison made by the comparison unit is based on differences of the mutual interference powers of the plurality of radio resources.

14. The communication apparatus of claim 2, wherein the comparison made by the comparison unit is based on differences of the mutual interference powers of the plurality of radio resources.

15. The communication apparatus of claim 1, wherein the comparison made by the comparison unit is based on differences of the mutual interference powers of the plurality of radio resources.

16. A communication system, comprising:

a communication apparatus for using a radio resource group comprising a plurality of radio resources; and another communication apparatus communicable with the communication apparatus;

wherein the communication apparatus comprises:

a comparison unit, implemented by a processor, that mutually compares interference powers of at least two radio resources of the plurality of radio resources which are used for communication with another communication apparatus; and a determination unit, implemented by the processor, that determines whether interference has occurred at the radio resources compared by the comparison unit based on comparison results of the comparison unit, wherein based on at least a first condition and a second condition, the determination unit determines:

that interference has not occurred at the radio resource which satisfies the first condition when the first condition is satisfied with all comparison results and the second condition is not satisfied with all comparison results; and that interference has occurred at the radio resource which satisfies the first condition when the first condition and the second condition are satisfied with all comparison results, and wherein:

the first condition is whether or not a difference value indicated by the comparison results is less than or equal to the first predetermined value, and the second condition is whether or not the value of the smallest interference powers indicated by the radio resources included in the radio resource group is equal to or more than the second predetermined value.

17. A control method for controlling a communication apparatus for using a radio resource group comprising a plurality of radio resources, comprising:

mutually comparing interference powers of at least two radio resources of the plurality of radio resources; and determining whether interference has occurred at the compared radio resources based on a result of the comparison, wherein based on at least a first condition and a second condition, said determination of whether interference has occurred includes:

determination that interference has not occurred at the radio resource which satisfies the first condition upon a determination that the first condition is satisfied with all comparison results and the second condition is not satisfied with all comparison results; and determination that interference has occurred at the radio resource which satisfies the first condition upon a determination that the first condition and the second condition are satisfied with all comparison results, and wherein:

the first condition is whether or not a difference value indicated by the comparison results is less than or equal to the first predetermined value, and the second condition is whether or not the value of the smallest interference powers indicated by the radio resources included in the radio resource group is equal to or more than the second predetermined value.

* * * * *